(12) United States Patent
Eriksson et al.

(10) Patent No.: US 10,938,137 B2
(45) Date of Patent: Mar. 2, 2021

(54) MULTICOUPLING WITH CONTROL MEANS

(71) Applicant: CEJN AB, Skövde (SE)

(72) Inventors: Jonas Eriksson, Skövde (SE); Jonas Olausson, Skövde (SE)

(73) Assignee: CEJN AB, Skövde (SE)

( * ) Notice: Subject to any disclaimer, the term of this patent is extended or adjusted under 35 U.S.C. 154(b) by 34 days.

(21) Appl. No.: 16/260,395

(22) Filed: Jan. 29, 2019

(65) Prior Publication Data

US 2019/0237886 A1     Aug. 1, 2019

(30) Foreign Application Priority Data

Jan. 30, 2018 (GB) .................................. 1801455

(51) Int. Cl.
| | |
|---|---|
| *F16L 37/23* | (2006.01) |
| *H01R 13/00* | (2006.01) |
| *F16L 37/56* | (2006.01) |
| *F17C 13/04* | (2006.01) |

(52) U.S. Cl.
CPC ............ *H01R 13/005* (2013.01); *F16L 37/23* (2013.01); *F16L 37/56* (2013.01); *F16L 2201/10* (2013.01); *F17C 13/04* (2013.01); *F17C 2205/037* (2013.01); *F17C 2205/0332* (2013.01)

(58) Field of Classification Search
CPC ....... F16L 37/23; F16L 37/56; F16L 2201/10; F16L 39/00; F16L 37/62; F17C 2205/037; F17C 2205/0332; F17C 13/04; G05B 9/03; H01R 13/005; H01R 13/641; H01R 13/717; H01R 13/7175

USPC ....... 439/191, 192, 194, 195, 286, 310–319, 439/332, 333, 476.1, 488–490, 315
See application file for complete search history.

(56) References Cited

U.S. PATENT DOCUMENTS

| | | | |
|---|---|---|---|
| 3,710,823 A | 1/1973 | Vik | |
| 3,960,428 A * | 6/1976 | Naus .................. | H01R 13/7035 439/315 |
| 4,192,347 A * | 3/1980 | Richard .................. | F16L 37/23 137/614.06 |
| 4,525,918 A * | 7/1985 | Puritz ................. | B23B 31/1074 279/89 |

(Continued)

FOREIGN PATENT DOCUMENTS

| | | |
|---|---|---|
| DE | 102015202916 A1 | 8/2016 |
| EP | 1657481 A2 | 5/2006 |

(Continued)

*Primary Examiner* — Travis S Chambers
(74) *Attorney, Agent, or Firm* — Lando & Anastasi, LLP

(57) ABSTRACT

A multicoupling comprising a first and second part comprising a first and second set of connectors; and rotational means for connecting the first part and second part. The first set of connectors comprise a plurality of couplings, or a plurality of nipples, or at least one coupling and at least one nipple, or at least one electric contact and at least one of a coupling or a nipple. The second set of connectors comprise, correspondingly, a plurality of couplings, or a plurality of nipples, or at least one coupling and at least one nipple, or at least one electric contact and at least one of a coupling or a nipple. The rotational means actuates, by rotation, control means for at least one connector of the first and/or second set of connectors, and the rotational means and the control means are in one and the same first part or second part.

14 Claims, 5 Drawing Sheets

(56) References Cited

U.S. PATENT DOCUMENTS

| | | | | |
|---|---|---|---|---|
| 4,840,574 | A * | 6/1989 | Mills | B23K 9/323 |
| | | | | 439/157 |
| 4,881,573 | A | 11/1989 | Durant et al. | |
| 4,990,022 | A * | 2/1991 | Watanabe | B25J 15/04 |
| | | | | 285/362 |
| 5,342,098 | A * | 8/1994 | Wilkins | F16L 37/56 |
| | | | | 285/124.1 |
| 5,507,530 | A | 4/1996 | Mahaney | |
| 5,984,371 | A | 11/1999 | Mailleux | |
| 6,053,756 | A * | 4/2000 | Flanigan | H01R 13/707 |
| | | | | 439/315 |
| 6,336,822 | B1 * | 1/2002 | Luzzoli | H01R 13/625 |
| | | | | 439/314 |
| 6,799,605 | B1 * | 10/2004 | Van Scyoc | F16L 37/56 |
| | | | | 137/594 |
| 7,967,630 | B2 * | 6/2011 | Houir Alanni | H01R 13/641 |
| | | | | 439/38 |
| 10,167,983 | B2 * | 1/2019 | Tomlinson | F16L 37/0885 |
| 10,457,058 | B2 * | 10/2019 | Akahane | B41J 29/38 |
| 2006/0130910 | A1 | 6/2006 | Knuthson | |
| 2006/0273580 | A1 * | 12/2006 | Marquis | F16L 37/56 |
| | | | | 285/124.5 |
| 2008/0265563 | A1 * | 10/2008 | Nicholson | H01R 13/523 |
| | | | | 285/31 |
| 2012/0205907 | A1 * | 8/2012 | Westendorf | E02F 3/3654 |
| | | | | 285/120.1 |
| 2014/0112699 | A1 * | 4/2014 | Lewkoski | F16B 17/00 |
| | | | | 403/33 |
| 2019/0154065 | A1 * | 5/2019 | Tiberghien | F16L 37/36 |
| 2019/0291588 | A1 * | 9/2019 | Chou | B60L 53/18 |
| 2020/0049293 | A1 * | 2/2020 | Rambaldini | F16L 37/16 |

FOREIGN PATENT DOCUMENTS

| | | |
|---|---|---|
| EP | 2818596 A2 | 12/2014 |
| EP | 3473906 A1 | 4/2019 |
| GB | 1324037 A | 7/1973 |
| JP | H07-035282 A | 2/1995 |
| JP | 2013-007186 A | 1/2013 |
| WO | WO-2008063131 A1 | 5/2008 |

* cited by examiner

MULTICOUPLING WITH CONTROL MEANS

CROSS-REFERENCE TO RELATED APPLICATION

This application claims priority to United Kingdom Application No. 1801455.5, titled MULTICOUPLING WITH CONTROL MEANS, filed Jan. 30, 2018, which is herein incorporated by reference in its entirety.

TECHNICAL FIELD

The present disclosure relates to a multicoupling and a method for controlling an action when connecting or disconnecting such a multicoupling. More particularly, the present disclosure relates to multicouplings with control means, such as for example releasing residual pressure within the multicoupling.

BACKGROUND

Multicoupling are multi-connection plates for hydraulic couplings, but also for other form of energy, such as electricity, fluid, air, control signals, etc. WO 2008/063131 discloses a multicoupling and may be useful for understanding the background art. Multicouplings allow a plurality of couplings to be made in one move. Pressure of hydraulic fluid and other forms of fluid and energy may remain or build up in the systems to be connected. It is therefore a problem how to remove and control such fluid and/or energy in multicouplings. The build up of pressure in the fluid can make it impossible for connects to be made to the multicoupling. To this adds the problem that any solution should be compatible with previous multicouplings. It is preferable if multicouplings also can allow single connections directly into a connector of the multicoupling. It is a problem how to realise a multicoupling that may allow further actions than only the couplings made by the multicoupling.

It is also desirable to provide a multicoupling that is inexpensive to manufacture, is easy to manufacture, and is robust. The multicoupling must also be able to provide a good and reliable flow through the multicoupling. It is further a restriction that the above must be realised in a cost effective way and in a simple and robust use and manufacturing. Too cumbersome solutions cannot be realised technically or economically in real life. The present disclosure is directed to overcoming one or more of the problems as set forth above.

SUMMARY OF THE INVENTION

It is an object of the present invention to provide a multicoupling that can control additional functions of the multicoupling and a method for controlling an action when connecting or disconnecting such a multicoupling. This object can be achieved by the features as defined by the independent claims. Further enhancements are characterised by the dependent claims.

One embodiment is a multicoupling comprising a first part comprising a first set of connectors, a second part comprising a second set of connectors, and rotational means for connecting the first part and second part. The first set of connectors comprises a plurality of couplings, or a plurality of nipples, or at least one coupling and at least one nipple, or at least one electric contact and at least one of a coupling or a nipple. The second set of connectors comprises, correspondingly, a plurality of couplings, or a plurality of nipples, or at least one coupling and at least one nipple, or at least one electric contact and at least one of a coupling or a nipple. The rotational means actuates, by rotation, control means for at least one connector of the first and/or second set of connectors, and the rotational means and the control means are in one and the same first part or second part.

According to one embodiment, the rotational means may comprise a cam acting on the control means. The control means may be one or more of the following group: valve, pilot valve, check valve, return valve, switch, electric switch, control system, a locking mechanism, and a release mechanism. The control means may be a valve or pilot valve, and the cam of the rotational means may act on the valve or pilot valve. According to one embodiment, the first part may comprise the rotational means, the first set of connectors, and the control means, and the first part may further comprise one or more channels from at least one connectors of the first set of connectors to the control means. The control means may be a valve, connectable to a tank, for releasing pressure.

According to one embodiment, the multicoupling may further comprise an additional electric connector and/or a data connector. According to one embodiment, the multicoupling may further comprise means for allowing one or more single connections to be made to one or both the first part and the second part, when the first part and the second part are disconnected, or connected. The means may be a locking sleeve in the coupling of the first part or in the coupling of the second part. The means may be the nipple of the first part or the nipple of the second part.

According to one embodiment, the control means may further comprise an (electronic) indicator indicating that the first part and the second part are correctly connected and/or identifies the connectors of the multicoupling. According to one embodiment, the multicoupling, preferably the control means, may additionally provide electronic indications, or pressure indications, for controlling (e.g. pressure) machinery connected to the first part or second part. According to one embodiment, the first part or the second part of a multicoupling may be separate.

According to one embodiment, a method for controlling an action when connecting or disconnecting a multicoupling according to any embodiment disclosed herein is disclosed. The method comprises rotating the rotational means to connect or disconnect the multicoupling; and controlling the action by the rotational position of the rotational means. The method may further comprise indicating, by the rotational position of the rotational means, that the first part and the second part are correctly connected and/or identifies the connectors of the multicoupling. The method may further comprise controlling, by the rotational position of the rotational means (300), machinery connected to the first part or second part.

At least one of the above embodiments provides that an action can be controlled by the multicoupling. This allows bleeding and control of peripheral actions relating to the multicoupling and the machinery connected by the multicoupling. Since identification can be made between the two parts of the multicoupling, a safer use of the multicoupling can be made. Further advantages and technical effects of the embodiments are described below.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any embodiment disclose herein may be combined with any other embodiment disclosed herein.

BRIEF DESCRIPTION OF THE DRAWINGS

The accompanying drawings illustrate presently exemplary embodiments of the disclosure, and together with the general description given above and the detailed description of the embodiments given below, serve to explain, by way of example, the principles of the disclosure.

DETAILED DESCRIPTION

In this disclosure the terms "coupling" refers to the female part of a connection and the term "nipple" refers to the male part of a connection. The female part, the coupling, may have a mechanism that connects to the male part, the nipple. Such a coupling and nipple may be, for example, a quick fit connection. A multicoupling is an arrangement of a plurality of male and/or female parts on one part and a corresponding plurality of female and/or male parts on another part and allows for a connection of all parts.

Figure 3:
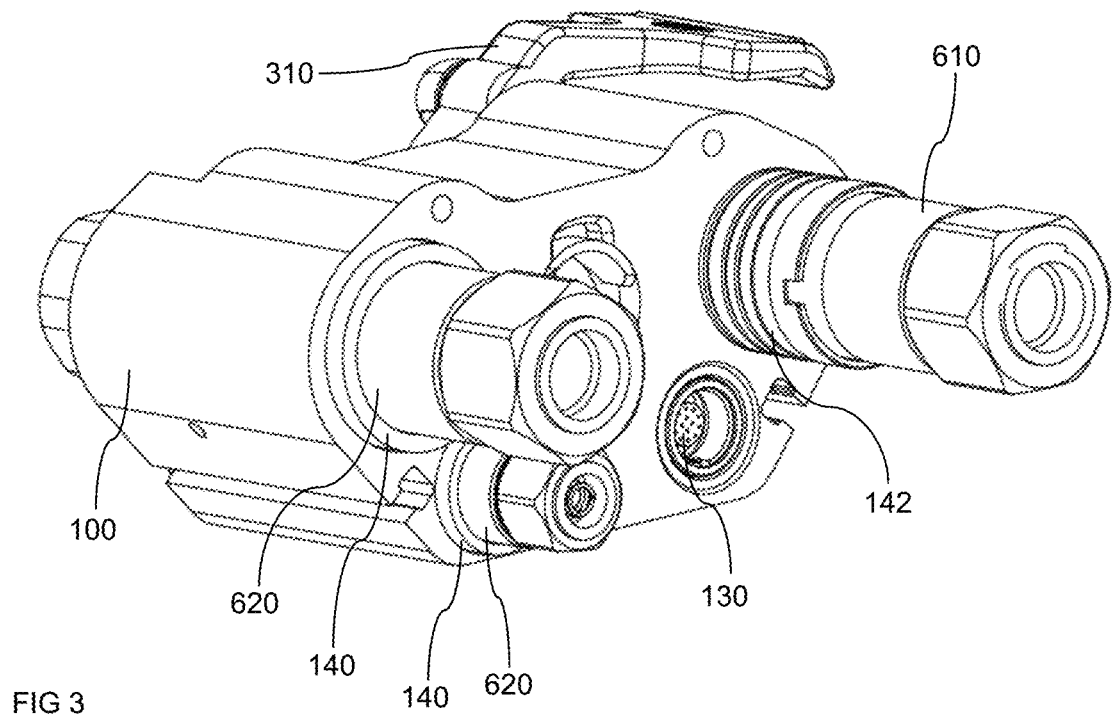
FIG. 3 is a diagrammatic illustration of a multicoupling according to an exemplary embodiment of the present disclosure.
Figure 4:
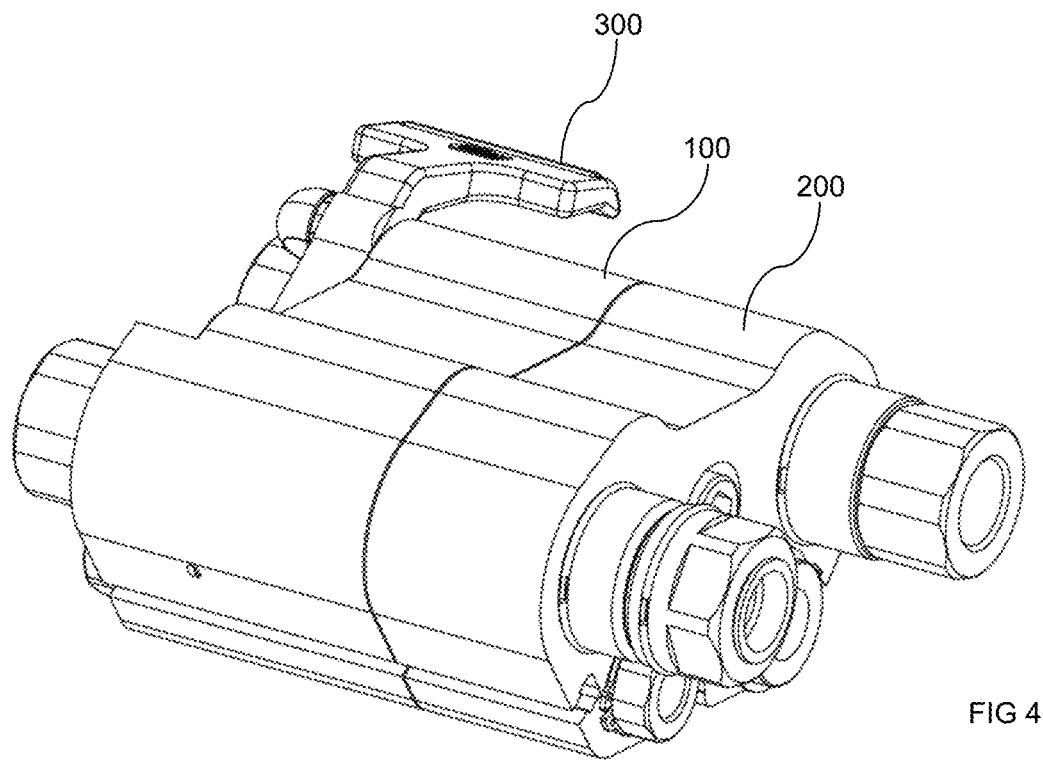
FIG. 4 is a diagrammatic illustration of a multicoupling according to an exemplary embodiment of the present disclosure.

The FIGS. 1 to 9 illustrate exemplary embodiment of a multicoupling. The multicoupling comprises a first part 100, see FIG. 1, a second part 200, see FIG. 2, and rotational means 300. The two part connected is illustrated in FIG. 4. The first part 100 comprises one or more couplings 120 and/or nipples 110 and/or electric contacts 130. The second part 200 comprises one or more couplings 220 and/or nipples 210 and/or electric contacts 230, preferably corresponding to the first part. The rotational means 300 is for connecting the first part 100 and second part 200. The rotational means 300 may be a handle 310 with a rotating central cylinder 300. The rotational means 300 actuates control means 500.

According to one embodiment, a multicoupling comprises a first part 100 comprising a first set of connectors, and a second part 200 comprising a second set of connectors. The first set of connectors comprises a plurality of couplings 120, or a plurality of nipples 110, or at least one coupling 120 and at least one nipple 110, or at least one electric contact 130 and at least one of a coupling 120 or a nipple 110. The second set of connectors comprising, correspondingly, a plurality of couplings 220, or a plurality of nipples 210, or at least one coupling 220 and at least one nipple 210, or at least one electric contact 230 and at least one of a coupling 220 or a nipple 210. The multicoupling further comprises rotational means 300 for connecting the first part 100 and second part 200. The rotational means 300 actuates, by rotation, control means 500 for at least one connector of the first and/or second set of connectors. The rotational means 300 and the control means 500 are in one and the same first part 100 or second part 200.

Figures 1, 2:
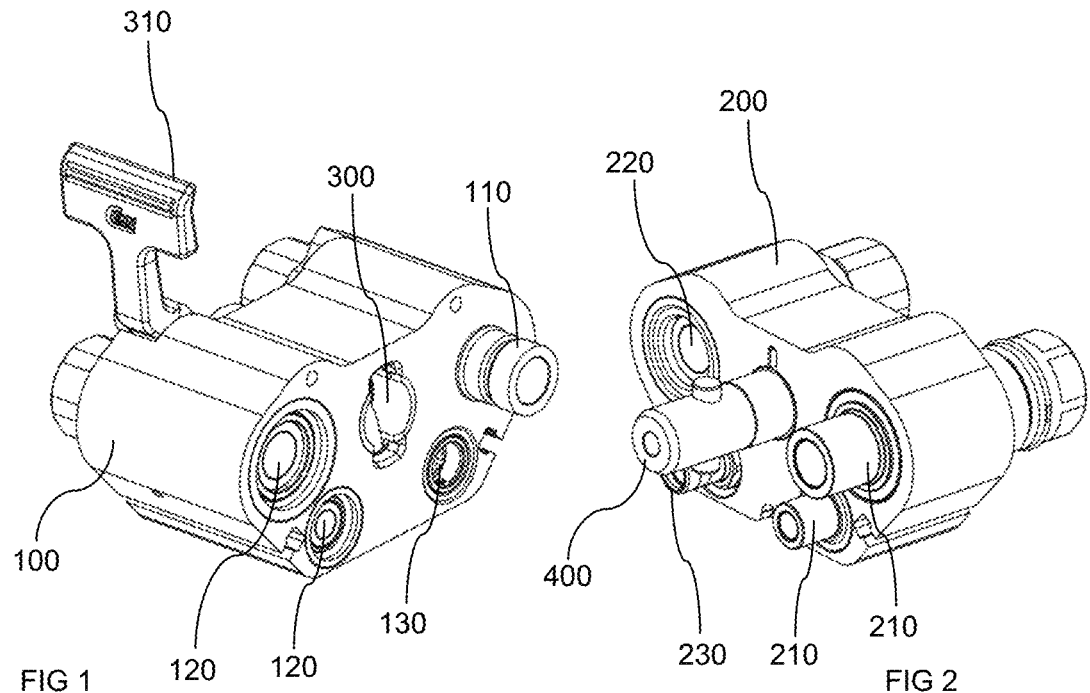
FIG. 1 is a diagrammatic illustration of a multicoupling according to an exemplary embodiment of the present disclosure.
FIG. 2 is a diagrammatic illustration of details of a multicoupling according to an exemplary embodiment of the present disclosure.

According to one embodiment, FIG. 1 illustrates the first part 100 comprising two couplings 120, one nipple 110, and one electronic contact 130. The rotational means 300 and its handle 310 are also illustrated. FIG. 2 illustrates the corresponding connections, where the second part 200 comprises two nipples 210, one coupling 220, and one electronic contact 230. A bolt 400 with two radial protrusions for the rotational means 300 is also illustrated in FIG. 2. As illustrated in FIGS. 1 and 2 the first part 100 and the second part 200 have complementary connectors forming a multicoupling. The control means 500 are not part of, is not one of, the first set of connectors or the second set of connectors.

According to one embodiment, the rotational means 300 may comprise a handle 310. The handle 310 may project out of the first part 100 or second part 200. The handle 310 may be used for rotating the rotational means 300 by hand force of a user. The rotational means 300 may be centrally inside the first part 100 or the second part 200 and interact with a bolt 400, such as for example a locking bolt 400, in the other corresponding part 100, 200. The locking bolt may be fixed, not being able to rotate. While the locking bolt 400 and the rotational means 300 may have axial electric contacts to contact each other, in the axial direction of the locking bolt 400 and the rotational means 300, such axial electric contact is not part of the control means 500 and not part of this disclosure.

According to one embodiment, the rotational means 300 may be substantially cylindrically formed with a spiral track in the rotational means 300. The spiral track may interact with a protrusion on the locking bolt 400, such that when the rotational means 300 are rotated, by turning the handle 310, then the first part 100 and the second part 200 may be pulled together by the protrusion following the spiral track.

According to one embodiment, the rotational means 300 and the control means 500 are both inside the first part 100, or the second part 200. They are not external to the first part 100, or the second part 200. In other words, the rotational means 300 and the control means 500 are both integral with the first part 100, or the second part 200. Naturally the handle 310 sticks out so that it can be rotated by hand force.

According to one embodiment, the rotational means 300 acts directly on the control means 500, i.e. without any mechanism between the rotational means 300 and the control means 500. According to one embodiment, rotating the rotational means 300 causes a displacement in the radial direction of the rotational means 300 and therefore a displacement on the control means. According to one embodiment, the rotational means 300 may be substantially cylindrically formed. The cylindrical rotating means 300 may comprise the spiral track for the protrusion of the bolt 400.

Figure 8:
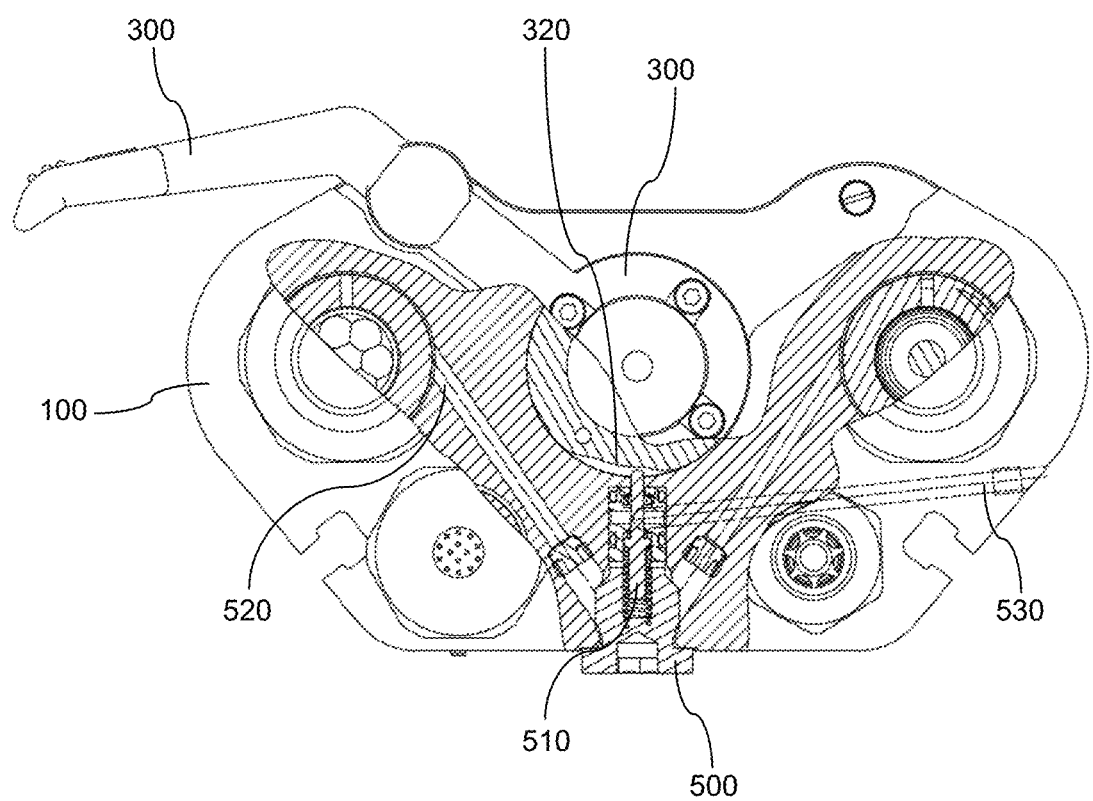
FIG. 8 is a diagrammatic illustration of a multicoupling according to an exemplary embodiment of the present disclosure.
Figure 9:
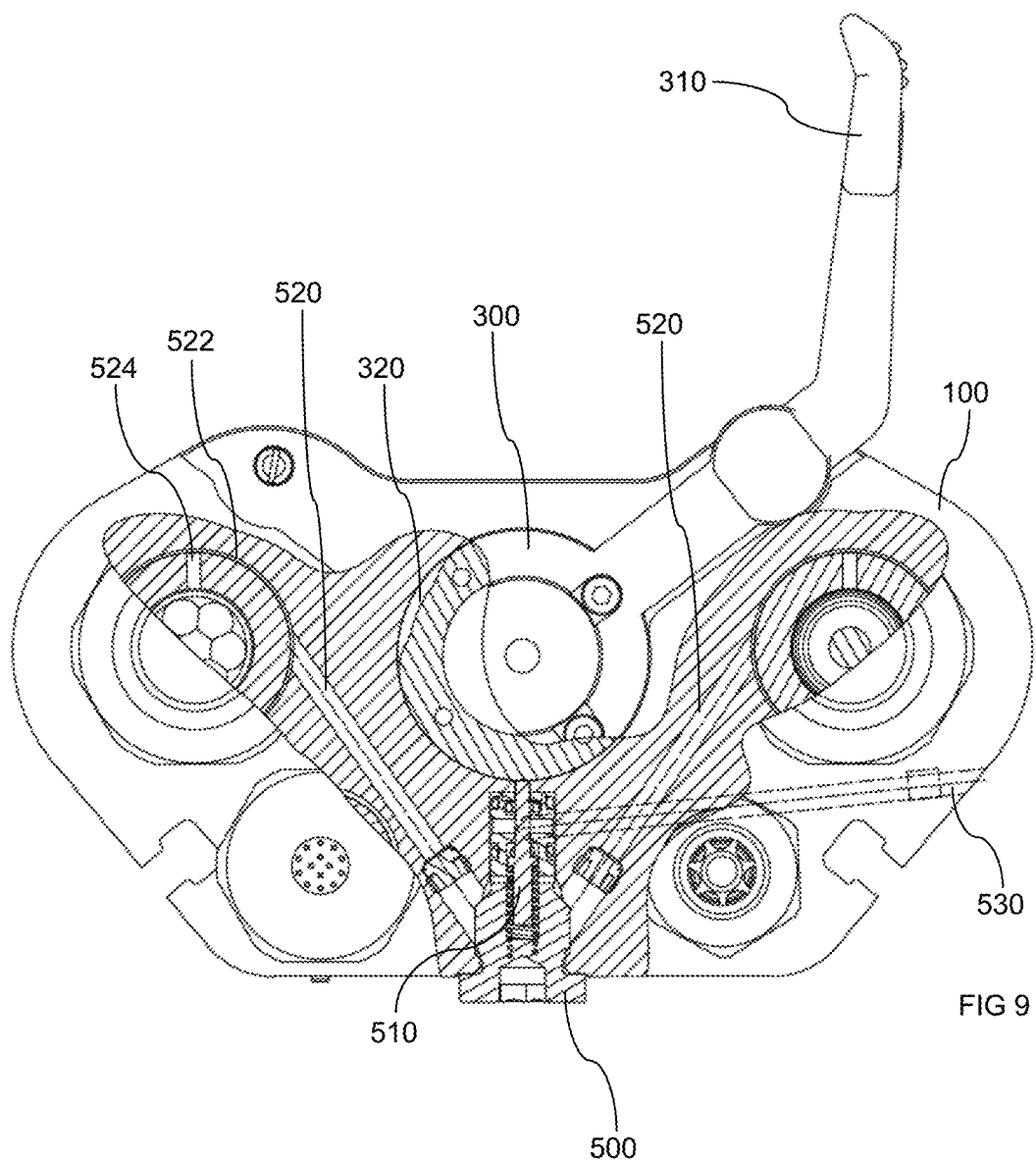
FIG. 9 is a diagrammatic illustration of a multicoupling according to an exemplary embodiment of the present disclosure.

According to one embodiment, the rotational means 300 may comprise a cam 320 acting, for example directly, on the control means 500. According to one embodiment, the cylindrically formed rotational means 300 may comprise the cam 320 as the circumference, or as a part of its circumference. The cam, or part, 320 of the circumference of the rotational means 300, may be shaped to contact directly the control means 500, for example the valve 500. This is illustrated in FIGS. 8 and 9 where the cam 320 is a part of the circumference of the rotational means 300 and acts on a valve 510 of the control means 500. A technical effect of having a part, the cam 320, of the circumference of the rotational means 300 contacting the control means, is that the control means 500 can be accurately controlled with respect to the rotation of the rotational means 300, that is with respect to how far the couplings and nipples of the multicoupling engage each other axially and connect or disconnect. This may in turn allow for a precis venting of residual pressure to allow connection or disconnection.

According to one embodiment, and according to the previous embodiment, the rotational means 300 may comprise the cam 320, and the rotational means 300 may be substantially cylindrical. The cam 320 may be a part of the circumference, along the radial periphery, of the substantially cylindrical rotational means 300. The cam 320, the part, may be shaped such that it comes into contact, preferably direct contact, with the control means 500, for example valve 510. Hereby the rotational means 300 may have at least two functions, namely on one hand pulling and connecting the first part 100 and the second part 200 together, and on the other hand controlling the control means 500. The controlling of the control means may be done without connecting the first and second parts, if the second part is not present.

According to one embodiment, the control means 500 may be one or more of the following group: valve 510, pilot valve, check valve, return valve, switch, electric switch, control system, a locking mechanism, and a release mechanism. The control means may, for example, vent the connectors, and/or control features on the multicoupling and/or control features on machinery connected by the multicoupling.

According to one embodiment, and as illustrated in FIGS. 8 and 9, the control means 500 may a valve 510 or pilot valve 510, and wherein the cam 320 of the rotational means may act on the valve or pilot valve. The cam 320 may be an integral part of the circumference of the cylindrical rotational means 300, and may act directly on the valve 510 or pilot valve 510. This allows an accurate and precise actuation of the control means.

According to one embodiment, the first part 100 may comprise the rotational means 300, the first set of connectors, and the control means 500. The first part 100 may further comprise one or more channels 520, 530 from at least one connector of the first set of connectors to the control means 500. The one or more channels 520, 530 may channel fluid from nipples or couplings of the first set of connectors out of the first part 100. This allows venting of residual pressure to allow connection or disconnection. Channels 520, 530 may additionally lead to an exit of the first part 100, or the second part 200, respectively. A channel 520, 530 may thus lead from one connector, for example coupling or nipple, to the control means, for example comprising a valve, and then lead on to the exit.

According to one embodiment, the control means 500 may be a valve, connectable to a tank, for releasing pressure. Residual pressure in the nipples or couplings may be released by a valve of the control means and channelled away to a tank. This allows venting of residual pressure to allow connection or disconnection.

According to one embodiment, the multicoupling may further comprise an additional electric connector and/or a data connector. The first part 100 and/or the second part 200 may comprise an electronic identification tag, for example an RFID tag. The corresponding part may be able to identify, read, the tag and knows therefore what part is connected in the multicoupling. For example, the first part 100 may have a data connector, such as an RFID tag, and the second part 200 may be able to read the RFID tag. When such a first part 100 and such a second part 200 are connected, then the multicoupling knows what two part are connected and such information can also relate to machinery that is connected by the multicoupling. Such machinery may also be controlled by such an electric connector and/or data connector. The additional electric connector and/or a data connector may indicate that the first part 100 and the second part 200 are completely, and therefore correctly, connected. The additional electric connector and/or a data connector may be an indicator on one of the parts and an identifier, a reader, may be one the other part.

According to one embodiment, independent or in combination with any embodiment disclosed herein, the multicoupling, with two parts each with couplings and/or nipples, may allow for one or more single couplings or nipples to be connected to one part of the multicoupling. Thus, not all connections are made using the two parts of the multicoupling, and instead, for example, by hand a single connection is made with only one coupling or nipple in one of the parts of the multicoupling. In other words, instead of connecting all couplings and nipples of the two parts of a multicoupling, only one or more connections are made with a part of the multicoupling. This allows for a connection of fluid or energy to be made to the first part 100 of the multicoupling without having to use the second part 200 to connect to the first part 100 of the multicoupling. This further embodiment may include the control means 500. The control means 500 may then control, for example vent, the one or more connections done directly into the first part 100 without the use of the second part 200 of the multicoupling.

One embodiment, independent or in combination with any embodiment disclosed herein, may be a multicoupling, with two parts each with couplings and/or nipples, where the two parts are connected and one of the two parts allow for a one or more single couplings or nipples to be connected to the one part of the multicoupling. Such connection is then made on a side facing away from the multicoupling.

According to one embodiment, the first part 100 may be used as a separate part, i.e. without the second part 200, as also explained above. This is useful in situations where a connection must be made with the first part 100, but with a single coupling or nipple instead of all connectors of the second part 200. Such a first part 100 includes the rotational means 300 and the control means 500. According to one embodiment, the second part 200 is a separate part, i.e. without the first part 100. Such a second part 200 excludes the rotational means 300 and the control means 500. Thus, according to one embodiment, separately or in combination with any other embodiment disclosed herein, the multicoupling may further comprise means 140, 142 for allowing one or more single connections to be made to one or both the first part 100 and the second part 200, when the first part 100 and the second part 200 are disconnected, or connected.

Figure 5:
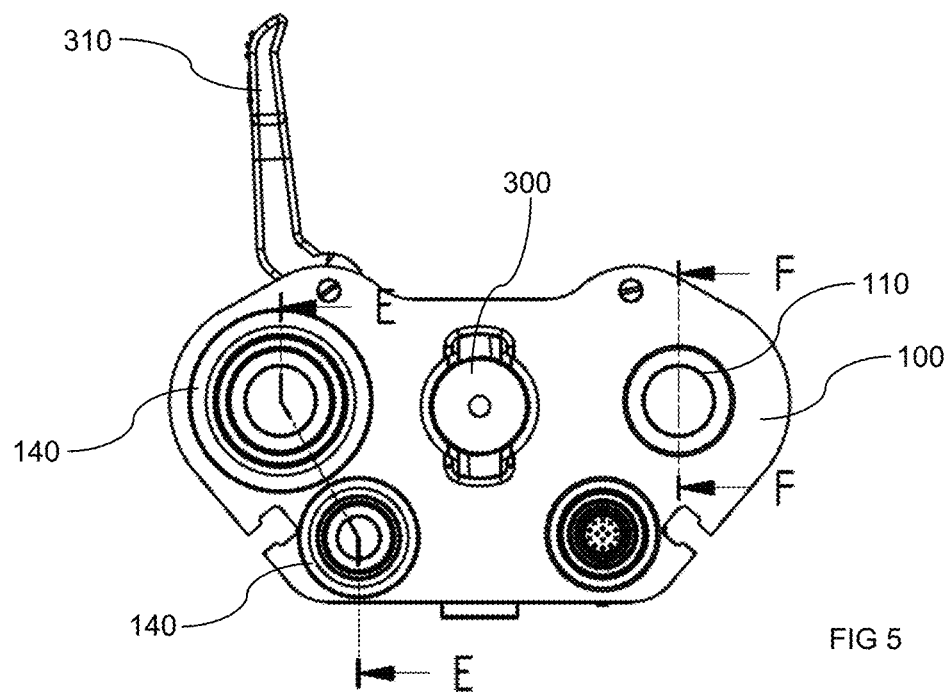
FIG. 5 is a diagrammatic illustration of a multicoupling according to an exemplary embodiment of the present disclosure.
Figure 6:
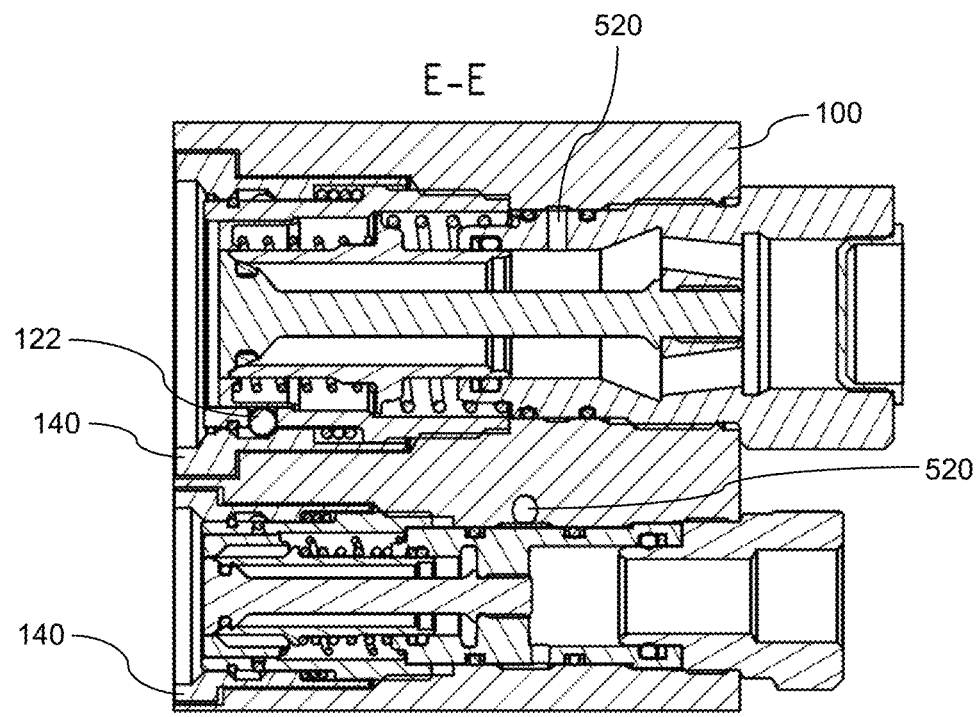
FIG. 6 is a diagrammatic illustration of a multicoupling according to an exemplary embodiment of the present disclosure.

According to one embodiment, the means may be a locking sleeve 140 in the coupling 120 of the first part 100 or in the coupling 220 of the second part 200. FIG. 3 illustrates an embodiment of the first part 100 with two locking sleeves 140 for the couplings 120, and two single nipples 620 connected to the couplings 120. In FIGS. 5 and 6 the two locking sleeves 140 are illustrated. The locking sleeves 140 are inside the first part 100, flush with the outside, the front face, of the first part 100, when the first part 100 is used as a multicoupling. However, when single nipples 620 having ball groves are connected to the couplings 120 then the locking sleeves 140 are protruding. When single nipples 620 not having a ball groove are connected, for example by use of nipples of the second part 200, then the locking sleeve 140 is flush with the outside, the front face, of the first part 100. Nipples without ball grooves are connected and held in place by the rotational means 300 and the locking bolt 400, while single nipples with ball grooves are connected and held in place by locking balls 122 of the locking sleeve in the coupling 120. The locking sleeve 140 comprises openings, not through holes, for the locking balls 122 of the coupling 120. The locking sleeve 140 is circumferential and external to the coupling 120, but inside the first or second part of the multicoupling. When the locking sleeves 140 are protruding, then locking balls 122 of the couplings 120 are engaging grooves in the single nipples 620. When a single nipple 620 is inserted, then a sleeve in the coupling 120 is pushed inwards and the locking balls 122 are pushes radially inwards by the locking sleeve 140, thereby allowing the locking balls 122 to engage a groove of the single nipple 620.

Figure 7:
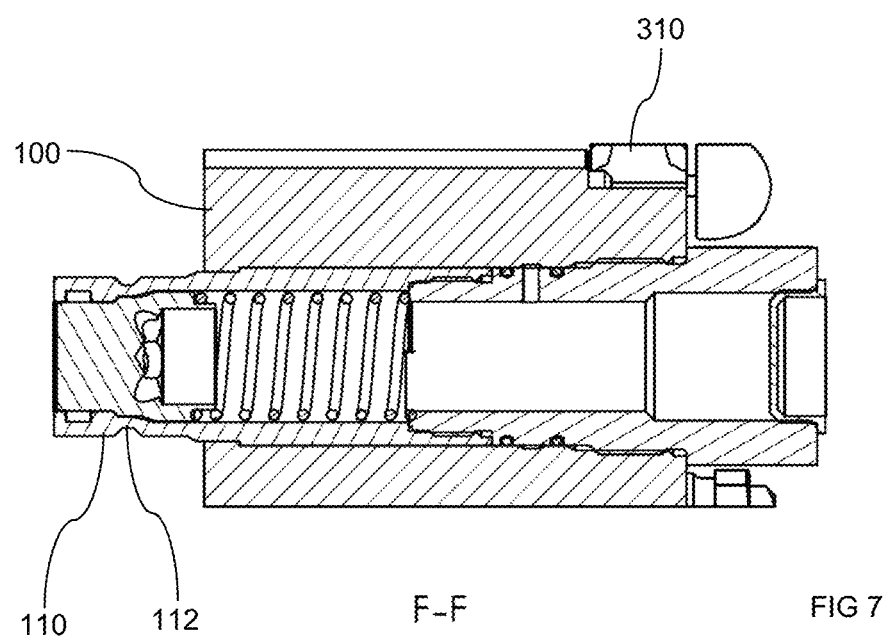
FIG. 7 is a diagrammatic illustration of a multicoupling according to an exemplary embodiment of the present disclosure.

According to one embodiment, the means may be the nipple 110 of the first part 100 or the nipple 210 of the second part 200. The nipple 110, 120 may protrude outside the front face of the first part 100 or the second part 200. FIG. 3 illustrates an embodiment of the first part 100 with the nipple 110, and a single coupling 610 connected to the nipple 110. In FIGS. 5 and 7 the nipple 110 is illustrated. When a single coupling 610 is connected to the nipple 110 of the first part 100, then locking balls of the single coupling 610 are pushed radially inwards by the outer sleeve 142 of the single coupling 610, thereby allowing the locking balls to engage the groove 112 of the nipple 110. This allows a single coupling 610 to be connected to one nipple 110 of the first part 100 or the second part 200.

According to one embodiment, the control means 300 may further comprise an indicator, preferably an electronic indicator, indicating that the first part 100 and the second part 200 are correctly connected and/or identifies the connectors of the multicoupling. The indicator may for example be an ID tag, a RFID tag, or any kind of electronic means. The first part 100 may comprise an indicator and the second part 200 may comprise a reader to read the indicator, or the other way around. The indicator may be arranged on the locking bolt 400 or in the rotational means 300, and the reader may be accordingly arranged. The indicator may be arranged on a front face of the first part 100 and the reader may be accordingly arranged on a front face of the second part 200. This allows the multicoupling to indicate that the first part 100 and the second part 200 are correctly connected, and/or to indicate what two parts have been connected, and/or to indicate instructions to machinery that are connected by the multicoupling. Such instructions could be, for example, required, minimum, and/or maximum fluid pressure.

According to one embodiment, the multicoupling, preferably the control means 500, may additionally provide electronic indications, or pressure indications, for controlling, for example pressure to and from, machinery connected to the first part 100 or second part 200. The control means 500 may therefore not only, for example, vent the connections, but also provide electronic indications, or pressure indications, when the handle 310 rotates the rotational means 300. This allows the multicoupling to indicate instructions to machinery that are connected by the multicoupling. Such instructions could be, for example, required, minimum, and/or maximum fluid pressure.

According to one embodiment, the first part 100 and the second part 200 may be separate parts, suitable for connecting to each other. For example, the first part 100 may comprise the rotational means 300, the first set of connectors, the control means 500, and one or more channels 520, 530. For example, the second part 200 may comprise the locking bolt 400, and the second set of connectors, and optionally one or more channels 520, 530.

According to one embodiment, a method for controlling an action when connecting or disconnecting a multicoupling according to any one of the above embodiments is disclosed. The method comprises rotating the rotational means 300 to connect or disconnect the multicoupling, and controlling the action by the rotational position of the rotational means 300. This allows for a good and accurate controlling of the action, because the rotational position can be made very precise and is in relation to how far the connection is made.

The method may further comprise that the action is actuated by the control means. The control means may be one or more of the following group: valve, pilot valve, check valve, return valve, switch, electric switch, control system, a locking mechanism, and a release mechanism.

According to one embodiment, the method may further comprise indicating, by the rotational position of the rotational means, that the first part 100 and the second part 200 are correctly connected and/or identifies the connectors of the multicoupling. This may for example be realised by using the cam 320 or an indicator as mentioned above.

According to one embodiment, the method may further comprise controlling, by the rotational position of the rotational means 300, machinery connected to the first part 100 or second part 200. This may for example be realised by using the cam 320 and a valve 510 as mentioned above.

It will be apparent to those skilled in the art that various modifications and variations can be made to the disclosed apparatus and method. Other embodiments will be apparent to those skilled in the art from consideration of the specification and practice of the disclosed apparatus and method. It is intended that the specification and examples be considered as exemplary only, with a true scope being indicated by the following claims and their equivalents.

LIST OF ELEMENTS 100 first part
110 nipple
112 groove
120 coupling
122 locking balls
130 electric contact
140 locking sleeve
142 sleeve
200 second part
210 nipple
220 coupling
300 rotational means
310 handle
320 cam
400 (locking) bolt
500 control means
520 channel
530 channel 610 (single) coupling
620 (single) nipple

The invention claimed is:

1. A multicoupling comprising:
a first part comprising a first set of connectors;
a second part comprising a second set of connectors;
the first set of connectors comprising a plurality of couplings, or a plurality of nipples, or at least one coupling and at least one nipple, or at least one electric contact and at least one of a coupling or a nipple;
the second set of connectors comprising, correspondingly, a plurality of couplings, or a plurality of nipples, or at least one coupling and at least one nipple, or at least one electric contact and at least one of a coupling or a nipple;
rotational means for pulling and connecting the first part and second part together, the rotational means comprising a spiral track;
control means, the control means being separate from the rotational means, and wherein the control means is at least one of a valve, a pilot valve, a check valve, a return valve, a switch, and an electric switch;
the rotational means acting directly on the control means, by rotation of the rotational means, and causing a displacement in a radial direction of the rotational means and thereby a displacement of the control means for at least one connector of the first and/or second set of connectors; and
wherein the rotational means and the control means are in one and the same first part or second part.

2. The multicoupling according to claim 1, wherein the control means is a valve, connectable to a tank, for releasing pressure.

3. The multicoupling according to claim 1, wherein the multicoupling further comprises an additional electric connector and/or a data connector.

4. The multicoupling according to claim 1, wherein the control means further comprises an indicator indicating that the first part and the second part are correctly connected and/or identifies the connectors of the multicoupling.

5. The multicoupling according to claim 1, wherein the multicoupling, preferably the control means, additionally provides electronic indications, or pressure indications, for controlling machinery connected to the first part or second part.

6. The multicoupling according to claim 1, wherein the rotational means comprises a cam acting on the control means.

7. The multicoupling according to claim 6, wherein the control means is a valve or pilot valve, and wherein the cam of the rotational means acts on the valve or pilot valve.

8. The multicoupling according to claim 1, wherein the multicoupling further comprises means for allowing one or more single connections to be made to one or both the first part and the second part, when the first part and the second part are disconnected.

9. The multicoupling according to claim 8, wherein the means for allowing the one or more single connections to be made to one or both the first part and the second part is the nipple of the first part or the nipple of the second part.

10. The multicoupling according to claim 7, wherein the first part comprises the rotational means, the first set of connectors, and the control means; and
wherein the first part further comprises one or more channels from at least one connector of the first set of connectors to the control means.

11. The first part or the second part of the multicoupling according to claim 10.

12. A method for controlling an action when connecting or disconnecting a multicoupling according to claim 1, the method comprising:
rotating the rotational means to connect or disconnect the multicoupling; and
controlling the action by the rotational position of the rotational means.

13. The method according to claim 12, the method comprising:
indicating, by the rotational position of the rotational means, that the first part and the second part are correctly connected and/or identifies the connectors of the multicoupling; and/or
controlling, by the rotational position of the rotational means, machinery connected to the first part or second part.

14. A multicoupling comprising:
a first part comprising a first set of connectors;
a second part comprising a second set of connectors;
the first set of connectors comprising a plurality of couplings, or a plurality of nipples, or at least one coupling and at least one nipple, or at least one electric contact and at least one of a coupling or a nipple;
the second set of connectors comprising, correspondingly, a plurality of couplings, or a plurality of nipples, or at least one coupling and at least one nipple, or at least one electric contact and at least one of a coupling or a nipple;
rotational means for pulling and connecting the first part and second part together, the rotational means comprising a spiral track;
control means, the control means being separate from the rotational means, and wherein the control means is at least one of a valve, a pilot valve, a check valve, a return valve, a switch, an electric switch, a control system, a locking mechanism, and a release mechanism;
the rotational means acting directly on the control means, by rotation of the rotational means, and causing a displacement in a radial direction of the rotational means and thereby a displacement of the control means for at least one connector of the first and/or second set of connectors;
means for allowing one or more single connections to be made to one or both the first part and the second part, when the first part and the second part are disconnected;
wherein the rotational means and the control means are in one and the same first part or second part; and
wherein the means for allowing the one or more single connections to be made to one or both the first part and the second part is a locking sleeve in the coupling of the first part or in the coupling of the second part.

* * * * *